United States Patent
Brush et al.

(10) Patent No.: US 6,886,033 B1
(45) Date of Patent: Apr. 26, 2005

(54) FLEXIBLE MEDIA REQUEST IDENTIFICATION TECHNIQUE

(75) Inventors: Wesley A. Brush, Brick, NJ (US); Mayra F. Caceres, Freehold, NJ (US)

(73) Assignee: AT&T Corp., New York, NY (US)

( * ) Notice: Subject to any disclaimer, the term of this patent is extended or adjusted under 35 U.S.C. 154(b) by 713 days.

(21) Appl. No.: 09/732,565

(22) Filed: Dec. 8, 2000

(51) Int. Cl.[7] .............................................. G06F 15/16
(52) U.S. Cl. ...................... 709/217; 709/218; 709/219; 709/203; 379/88.13; 379/88.21
(58) Field of Search ................ 709/203, 217, 709/218, 219, 200; 379/88.21, 88.13

(56) References Cited

U.S. PATENT DOCUMENTS

| | | | | |
|---|---|---|---|---|
| 5,438,568 A | * | 8/1995 | Weisser, Jr. .................. 370/389 |
| 5,519,640 A | * | 5/1996 | Ganesan et al. ............ 709/236 |
| 5,535,263 A | * | 7/1996 | Blumhardt ............... 379/88.21 |
| 5,646,945 A | * | 7/1997 | Bergler ........................ 370/419 |
| 5,815,561 A | * | 9/1998 | Nguyen et al. ........ 379/115.01 |
| 2002/0071529 A1 | * | 6/2002 | Nelkenbaum ............ 379/88.13 |
| 2002/0141381 A1 | * | 10/2002 | Gawargy et al. ............ 370/352 |

* cited by examiner

Primary Examiner—Nabil ElHady

(57) ABSTRACT

A protocol independent and platform independent message format is provided for the transmission of messages between network elements. Service providers are providing multimedia services over broadband networks to customers, and a generic message format is provided to accommodate communication between network elements facilitating the multimedia services. The generic message format includes at least one 32-bit media identifier (MID) identifying a type of media file associated with a message using the generic message format. A message having the generic message format may include up to 32 MIDs, each having two sections. The first section of an MID preferably includes 8 bits and has a media file descriptor (MFD). The MFD may be mapped for accommodating multiple types of media. The second section preferably includes twenty-four bits and has a media file identification (MFI). The MFD contains information that describes the use of the MFI, such as a type of media file or a type of announcement in the media file identified by the MID.

21 Claims, 4 Drawing Sheets

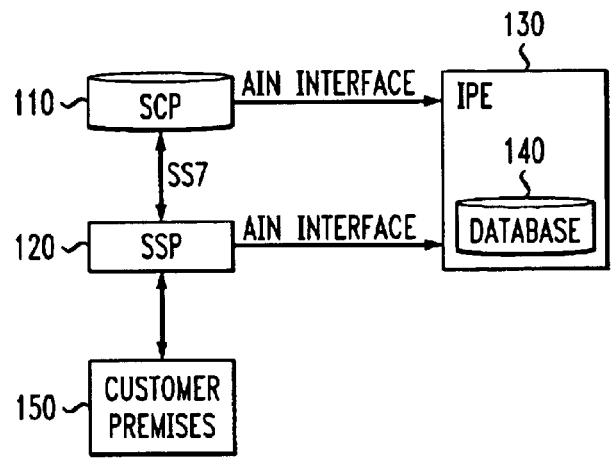

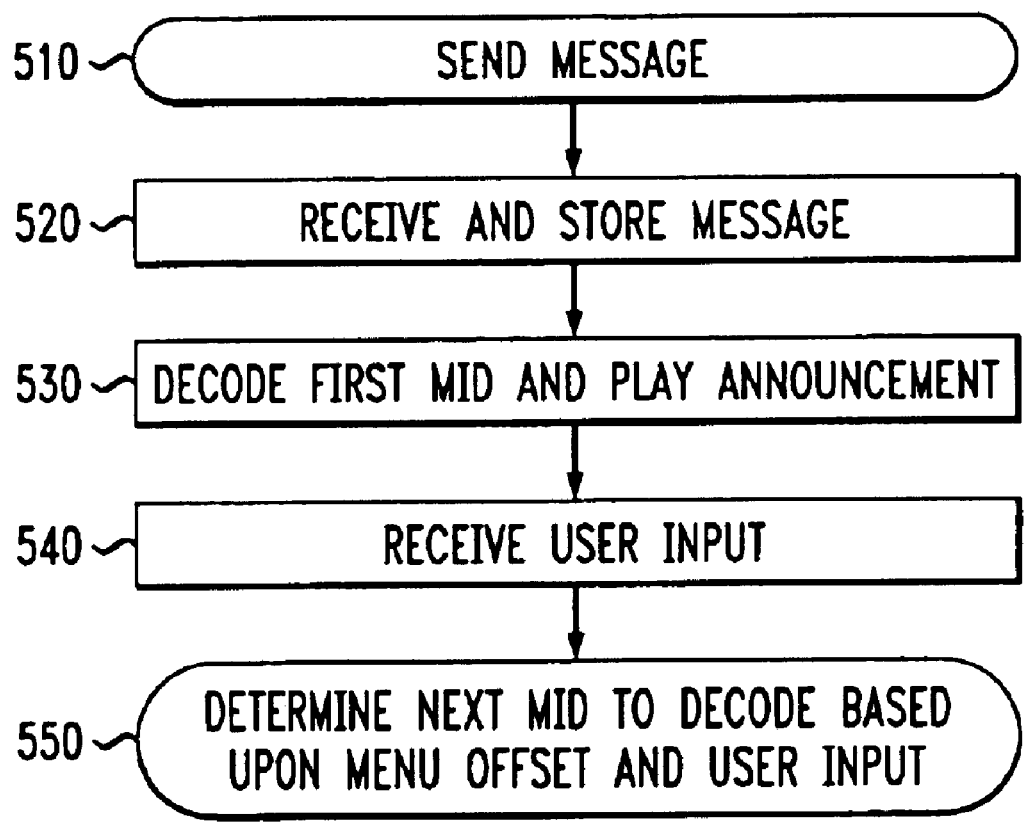

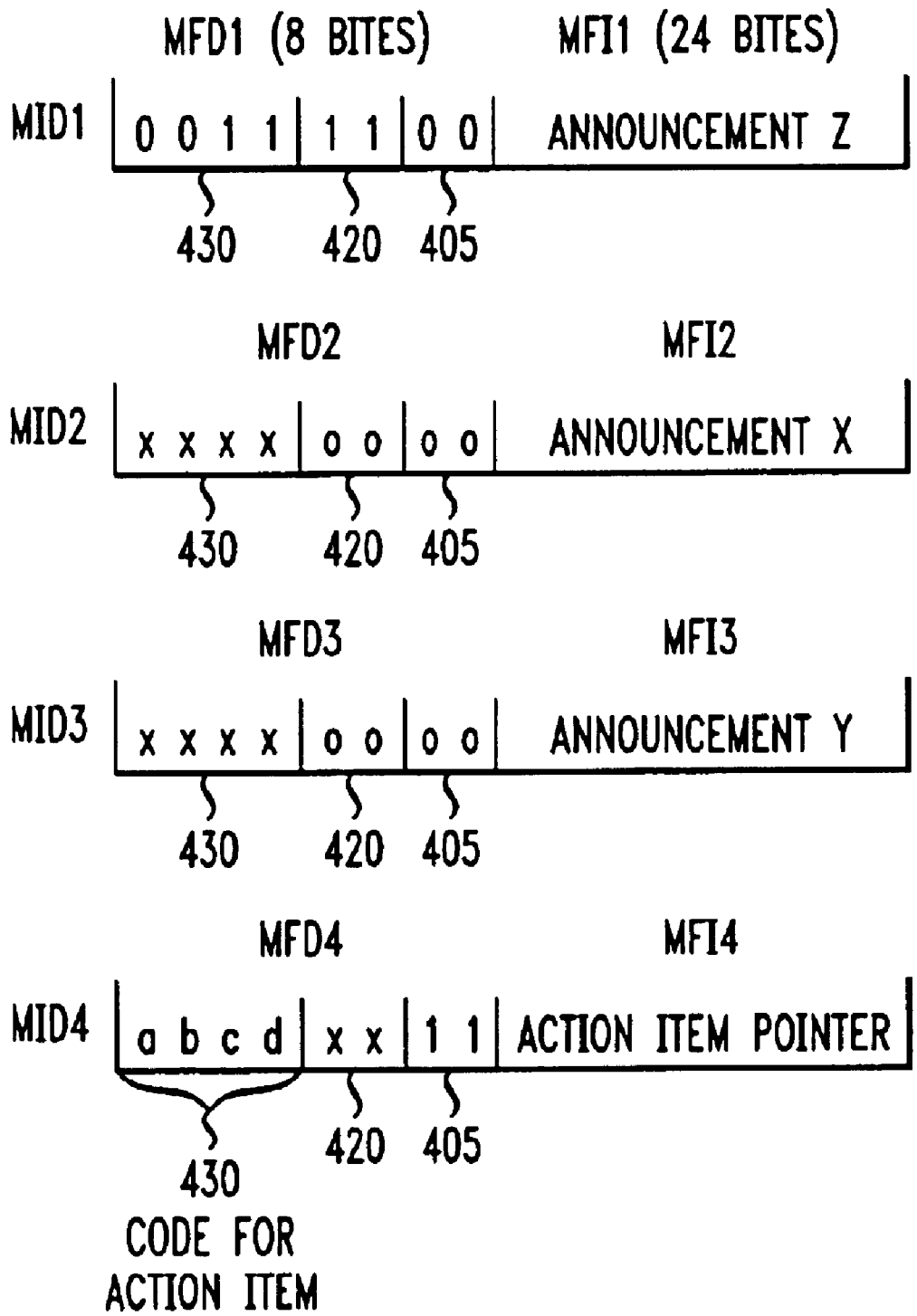

US 6,886,033 B1

FLEXIBLE MEDIA REQUEST IDENTIFICATION TECHNIQUE

FIELD OF THE INVENTION

The present invention relates generally to a technique for communicating information between elements in a network. More particularly, the present invention relates to a generic message format for communicating messages, which can relate to multiple types of media, between network elements.

BACKGROUND OF THE INVENTION

Currently there are numerous data communication protocols. Generally, each protocol has been developed to meet a specific set of communication needs. For example, typical telecommunications networks include advanced intelligence networks (AINs) for routing calls and providing custom telephony services. An AIN message format is used for communication between telecommunication network elements.

FIG. 1 illustrates an exemplary AIN architecture for a conventional telecommunications network, such as provided by AT&T, for which the message format of the present invention may be used. Network 100 includes intelligent peripheral (IPE) 130, which is connected to multiple customer premises 150 via service switching point (SSP) 120. Network 100 also includes service control point (SCP) 110, such as a computer having a database storing customer-specific information. SSP 120 communicates out-of-band with SCP 120 via an SS7 network for determining call routing and for providing telephony services for calls originating from and received by IPE 130. IPE 130 is connected to SSP 120 through a transport supporting AIN or other call control signaling protocol. IPE 130 can maintain database 140 for storing multimedia (e.g., announcements, movies, music, data and the like) that is provided to customers connected to IPE 130. IPE 130 may also be connected to other databases (not shown) storing multimedia and located remotely, for example, at other IPEs or at a central office. In addition, IPE 130 is configured for establishing network connections for customers via SSP 120.

Signaling between IPEs and SCPs is performed using a conventional AIN message format. For example, SCP 110 may provide a service for a customer connected to IPE 130, such as sending an announcement to a caller after being notified by SSP 120 that a call for the customer has been received. In order to provide the announcement to the caller, SCP 110 builds an AIN message that identifies one or more announcements stored, for example, in database 140 in IPE 130. The AIN message is transmitted to IPE 130 and the announcement that is identified by the AIN message is transmitted to the caller by IPE 130.

FIG. 2 illustrates an AIN announcement set 10 sent, for example, by SCP 110 to IPE 130 that identifies an announcement to be played to a caller. Announcement set 10 can contain one 16-bit announcement identification (id). Announcement set 10 includes one announcement id 20 having two octets, A1 and A2. An announcement id can identify an interruptible or an uninterruptible announcement. An interruptible announcement implies interaction with a user, such as the user entering digits. Announcement set 10 is representative of an AIN message sent from SCP 110 to IPE 130 that includes confirmation of digits entered by a user in response to an announcement in a previous AIN message. For example, IPE 130 receives AIN announcement set 10 from SCP 120 and searches database 140 for the announcement that corresponds to announcement id 20. IPE 130 sends the announcement to a caller, and the announcement includes the digits in octets C1 and C2 that were previously entered by the customer. Announcement set 10 also includes octet B that identifies the number of digits in octets C1 and C2.

Announcements often include a menu of items that require a caller to select one of the menu items. After a menu item is selected, another announcement, which may include another menu of items (e.g., a submenu), is played to the caller based on the selection. All announcement ids are processed sequentially by an IPE using the conventional AIN message format shown in FIG. 2. Consequently, multiple announcement elements for a received AIN message are processed by the IPE. Thus, when a caller is required to select a menu item, a single, conventional AIN message may not be used for conveying menus and submenus to the caller. Instead, multiple AIN messages are exchanged between an IPE and SCP for providing announcements for menus and submenus that require user interaction. The exchange of multiple AIN messages increases network traffic, thereby reducing link capacity and increasing transmission delay.

Additionally, with the increase in bandwidth available to customers, a variety of services, other than announcements, that are related to multiple types of media may be available to customers. For example, services providing video or music on demand or news services providing current information may be purchased by customers. Consequently, what is needed is a service platform (e.g., an SCP) that provides a service to a customer through a resource (e.g., an IPE) that has a flexible message format accommodating requests related to multiple types of media. In addition, a need exists for a generic message format that does not require sequential processing of messages.

SUMMARY OF THE INVENTION

It is an aspect of the present invention to provide a generic message format that supports user requests related to multiple types of media. It is a further aspect of the present invention to provide a generic message format that is platform and protocol independent and that may be used with multiple types of distribution plants.

According to the invention, a generic message format includes at least one 32-bit media identifier (MID) having two sections. The first section preferably includes 8 bits and has a media file descriptor (ED). The second section preferably includes twenty-four bits and has a media file identification (MFI). The MFD contains information that describes the use of the MFI, such as the type of multimedia or the type of announcement. The MFD may be mapped for accommodating different types of multimedia.

The generic message format of the present invention is ideal for facilitating multimedia services to customers. Additionally, the flexibility of the message format of the present invention leads to lower development costs and faster time-to-market for network elements. Also, information (e.g., announcement identifiers for menus and submenus) necessary for the resource to provide the requested service can be transmitted in one message. Therefore, less network traffic is created and less processing by network elements is required.

BRIEF DESCRIPTION OF THE DRAWINGS

The present invention is illustrated by way of example and not limitation in the accompanying figures in which like reference numerals indicate similar elements and in which:

FIG. 1 illustrates a schematic block diagram of a conventional AIN;

FIG. 2 illustrates a conventional AIN message element;

FIG. 3 illustrates a message format according to a preferred embodiment of the present invention;

FIG. 5 illustrates a flow-diagram for processing a message according to a preferred embodiment of the present invention; and FIG. 6 illustrates a message processed according to the flow-diagram of FIG. 5.

DETAILED DESCRIPTION OF THE INVENTION

Figure 4:
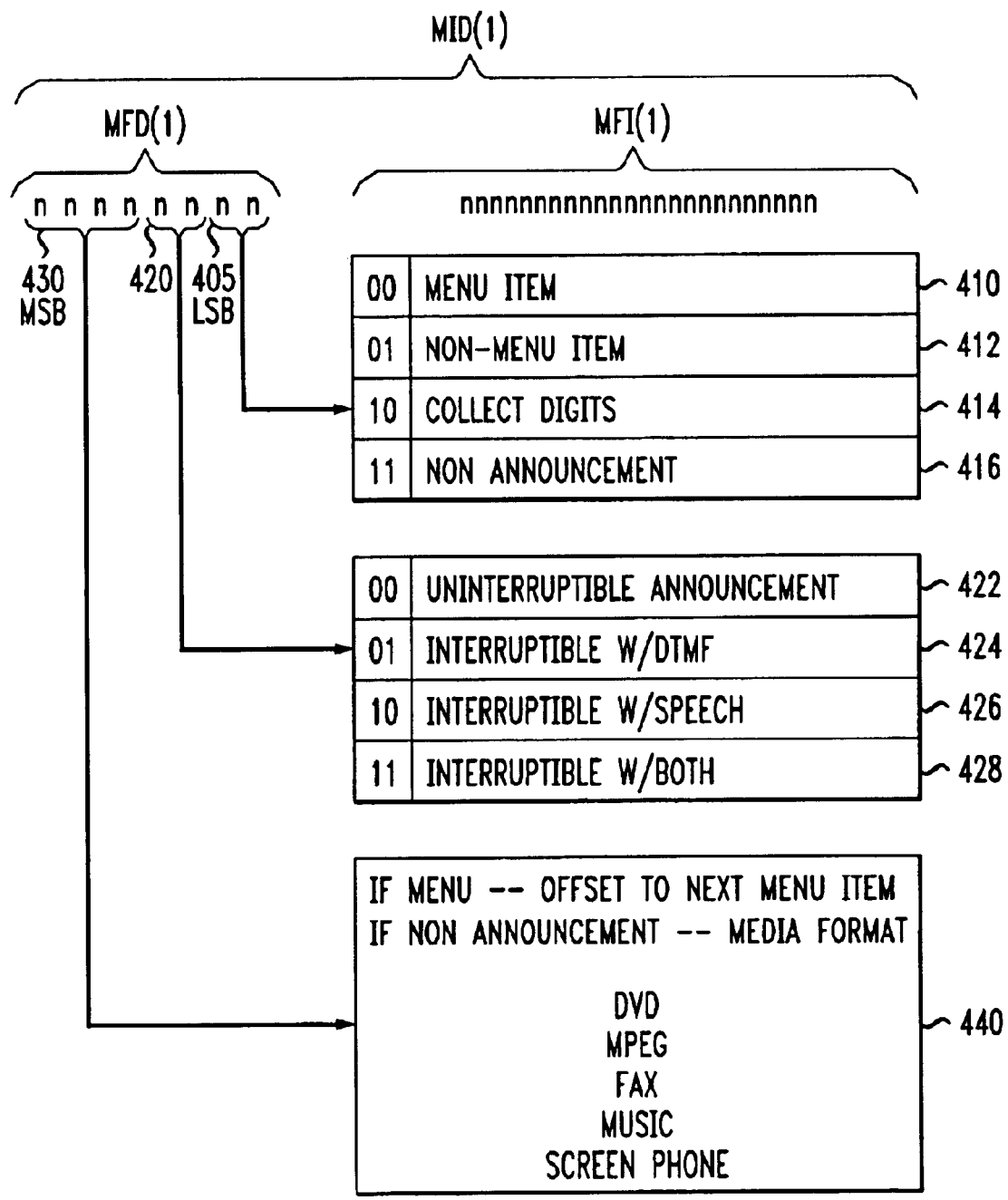
FIG. 4 illustrates an exemplary mapping of an MID according to according to a preferred embodiment of the present invention.

In a preferred embodiment of the present invention, message format 300, shown in FIG. 3, is used for passing information between network elements. Network elements (e.g., IPE, SCP, SSP and other service processing elements) may include components of any broadband or narrowband network, and network elements are not limited to elements of an intelligent network. Message format 300 is also protocol independent. For example, message format 300 may be implemented using SS7, ATM, TCP/IP or other known protocols. Additionally, message 300 supports, in addition to announcements, any multimedia (e.g., data, voice, video and fax) that may be provided to a customer.

FIG. 3 illustrates message 305 using message format 300 and which is transmitted, for example, from SCP 110 to IPE 130. Message format 300 preferably includes one to thirty-one MIDs, and each MID preferably includes thirty-two bits (four octets). The first octet of each MID is a MFD, and the remaining three octets form the MFI. Each MFD contains information that describes the MID. The MID includes, for example, a pointer to a file that contains the desired multimedia.

Message 305 includes four MIDs (i.e., MID(1)–MID(4)). MID(1) is shown in FIG. 3 and includes four octets. MFD(1) is included in octet 310 and MFI(1) is included in octets 320–340.

FIG. 4 illustrates a preferred embodiment of the present invention for mapping a MID, such as MID(1). As discussed above, MID(1) includes MFD(1) and MFI(1). MFD(1) includes bits 405, 420 and 430. Bits 405 are shown as including the least significant bit of MFD(1) for illustrative purposes, and bits 405, 420 and 430 may be placed in any order. For example, bits 430 may be located such that the least significant bit of MFD(1) is included in bits 430.

Bits 405 of MFD(1) designate the following: whether MID(1) includes an announcement for a menu item 410; whether MID(1) includes an announcement for a non-menu item 412; whether the receiving device, such as IPE 130, collects digits input by a customer 414; or whether MID(1) includes a non-announcement 416, such as multimedia format information (e.g., DVD, MPEG, MP3 and the like). Bits 420 of MFD(1) describe the type of announcement included in MID(1). For example, when MID(1) includes an announcement, bits 420 designate whether the announcement is uninterruptible 422, interruptible with DTMF 424, interruptible with speech 426, or interruptible with either DTMF or speech 428. When MID(1) includes a non-announcement, then bits 430 designate the multimedia format 440 (e.g., DVD, MPEG, MP3 and the like) for the non-announcement identified by MFI(1). Also, bits 430 may identify an action item that can be performed by IPE 130. For example, bits 430 may include a pointer that points to one of a list of action items stored in a database. An action item may include, for example, connect to voice mail, replay announcement, play error message announcement and the like. The order of bits 405, 420 and 430 is shown for illustrative purposes, and bits 405, 420 and 430 may be placed in any order.

IPE 130 may receive a message that includes an interruptible menu item or non-menu item and thus collects digits input by a caller. Also, IPE 130 may receive a message instructing the IPE to collect digits without playing an announcement, and this message would include "10" for bits 420 in an MFD.

As discussed above, message format 300 preferably includes up to thirty-one MIDs, and each MID may identify an announcement for a menu or submenu. Message 305 includes four MIDs transmitted from SCP 120 to IPE 130. MID(1)–(4) are stored in IPE 130 when received. Rather than processing MID(1)–(4) sequentially, IPE 130 can process the announcements identified by MID(1)–(4) based on bits 430 designating a menu offset. For example, MID(1)–(4) identify announcements for a menu, data or an action item. MID(1) identifies an announcement for a menu interruptible by DTMF. Therefore, bits 405 are "00" and bits 420 are "01". The announcement identified by MID(1) states, for example, "Enter the party's extension." IPE 130 sends the announcement to a caller and receives the party's extension from the caller. IPE 130 compares the received party's extension to the menu offset represented by bits 430 for determining the next announcement, such as any one of the announcements identified by MID(2)–(4), to transmit to the caller.

Message format 300 allows IPE 130 to process the MIDs in message 305 in a non-sequential manner. This feature is especially beneficial when MIDs convey announcements for menus and submenus, because SCP 120 may transmit one or a limited number of messages to IPE 130 to identify all the announcements used in the menus and submenus.

FIG. 5 is a flow-diagram illustrating the steps for processing a message in IPE 130. In step 510 (shown in FIG. 5), SCP 120 sends message 600 (shown in FIG. 6), utilizing message format 300, to IPE 130.

Message 600 includes a menu with three options and has four MIDs. For example, MID1 includes MFD1 and MFI1. MFD1 includes the following: a menu offset of "0011" (bits 430), indicating that three menu items are included in message 600; two bits of "11" (bits 420), indicating that an announcement identified by pointer "z" in MFI1 is interruptible by both speech and DTMF; and two bits of "00" (bits 405) indicating that the announcement is part of a menu. For example, the announcement identified by pointer "z" states, "Thanks for calling. Press or say one for directions; press or say two for hours of operation; press or say three to leave a message."

In step 520 (shown in FIG. 5), IPE 130 receives message 600 and stores it in a memory (not shown) for decoding.

In step 530 (shown in FIG. 5), IPE 130 decodes MID1 and plays the announcement identified by pointer "z". For example, IPE 130 is connected to database 140, located remotely or locally, that stores a plurality of announcements, and IPE 130 uses pointer "z" to retrieve a stored announcement from database 140. The announcement is played to the caller. In step 540 (shown in FIG. 5), because MID1 is an interruptible menu item, IPE 130 receives a user input from the caller (e.g., DTMF or voice selecting one, two or three in response to the announcement).

In step 550 (shown in FIG. 5), IPE 130 uses the user input and the menu offset in MID1 for determining the next announcement to play to the caller or for determining the next action to take. For example, the menu offset is equal to three. Therefore, if the caller presses "1", IPE 130 decodes the next MID following MID1, which is MID2. If the caller presses "2", IPE 130 decodes MID3 (i.e., the second MID following MID1). If the caller presses "3", IPE 130 decodes MID4. If the caller presses 4, IPE 130 recognizes that only three options are available to the caller (i.e., the menu offset is equal to three). IPE 130 may then play an error message and replay announcement "z".

When decoding MID2 or MID3 (shown in FIG. 6), bits 430 in MID2 or MID 3 are ignored. MID2 and MID3 include uninterruptible announcements. Therefore, MID2 and MID3 are not part of submenus that play other announcements in response to an input by the caller, and MID2 and MID3 do not have an offset. Also, MID2 and MID3 are announcements, and thus bits 430 in MID2 and MID 3 do not identify a media format.

When decoding MID4 (shown in FIG. 6), bits 420 are ignored. MID4 identifies an action item (i.e., an action performed by IPE 130), such as connecting to voice mail. Therefore, bits 420, which identify a type of announcement, are ignored, because MID4 does not identify an announcement. Bits 430 of MID4 identify a code for an action item. IPE 130 reads the action item code in bits 430 and determines that an action is to be performed. The action to be performed is identified by the pointer in MFI4. For example, database 140 includes a plurality of action items that may be identified by pointers. IPE 130 retrieves the action item from the database and performs a corresponding action.

What has been described are the preferred embodiments of the present invention. It, however, will be apparent to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

What is claimed is:

1. A message for communication among network elements, the message comprising:
   at least one media identifier including a first section and a second section, wherein the first section identifies one of a stored media file retrieved by a network element and an action item performed by the network element, and the second section identifies a media file type of the stored media file when the first section identifies the stored media file.

2. The message of claim 1, wherein ite stored media file includes one of an announcement and a non-announcement type media file, the non-announcement type media file including media other that announcements and the announcement type media file including an announcement.

3. The message of claim 2, wherein the second section includes a first group of bits identifying whether an announcement or non-announcement type media file is identified by the at least one media identifier.

4. The message of claim 3, wherein the second section includes a second group of bits, and when an announcement type media file is identified by the first group of bits, the second group of bits identifies whether an announcement in the identified announcement type media file is interruptible or uninterruptible.

5. The message of claim 4, wherein the second group of bits identifies whether an interruptible announcement is interruptible with one of DTMF, speech and both DTMF and speech.

6. The message of claim 3, wherein when an announcement type media file is identified by the first group of bits, the first group of bits also identifying whether the announcement is a menu item.

7. The message of claim 6, wherein the second section includes a third group of bits, aud when an announcement type media file is identified by the first group of bits, the third group of bits identifying a menu offset used to determine the next announcement to play to a caller.

8. The message of claim 7, wherein the at least one media identifier includes a plurality of media identifiers, and the menu offset is used to identify one of the plurality of media identifiers.

9. The message of claim 6, wherein the second section includes a third group of bits, and when a non-announcement type media file is identified by the first group of bits, the third group of bits identifies one of a media file format and an action item code.

10. The message of claim 1, wherein the media file includes one of video, fax, music, data and an announcement.

11. The message of claim 1, wherein the plurality of network elements include network elements in a telecommunications network.

12. The message of claim 11, wherein the telecommunications network includes an intelligent network, and the plurality of network elements include an intelligent peripheral and a service control point.

13. A system available to provide a multimedia service, comprising:
   a first network element transmitting a message, the message including at least one media identifier identifying a media file and including a first section and a second section, wherein the first section identifies one of a stored media file and an action item, and the second section identifies a media file type of the stored media file when the first section identifies the stored media file; and
   a second network element receiving the message and connectable to a database storing the media file.

14. The system of claim 13, wherein the first and second network elements are included in an intelligent network providing multimedia services.

15. The system of claim 14, wherein the message identifies one of an announcement, video, music, fax and data.

16. A message for communicating a plurality of menu items to a network element, the message comprising:
   a plurality of media identifiers, each media identifier identifying a menu item; and
   at least one of the plurality of media identifiers including a menu offset used to identify another one of the plurality of media identifiers in response to a user input.

17. The message of claim 16, wherein each menu item includes one of an announcement and an action item.

18. The message of claim 16, wherein each media identifier includes a first section and a second section, and wherein:
   the first section identifies one of a stored media file retrieved by a network element and an action item performed by the network element; and
   the second section identifies a media file type of the stored media file when the first section identifies the stored media file.

19. A method of processing a message for communicating between network elements, the message having a format including a plurality of media identifiers, each media identifier identifying one of a media file and an action item, the method comprising steps of:

receiving the message and storing the message in memory;

decoding a first media identifier of said plurality of media identifiers, the first media identifier including a menu offset;

receiving a user input; and selecting a second media identifier of said plurality of media identifiers to decode based upon the user input and the menu offset.

20. The method of claim 19, wherein each of said plurality of media identifiers identifies a menu item for a menu.

21. The method of claim 20, wherein the first media identifier identifies an announcement prompting the user to select one of a plurality of the menu items and further comprising a step of playing the announcement to the user after decoding the first media identifier.

* * * * *